(12) United States Patent
Gladen (10) Patent No.: US 6,418,807 B2
(45) Date of Patent: Jul. 16, 2002

(54) STABILIZER FOR BALL SCREW ACTUATOR

(75) Inventor: Paul B. Gladen, Golden Valley, MN (US)

(73) Assignee: Tol-O-Matic, Inc., Hamel, MN (US)

( * ) Notice: Subject to any disclaimer, the term of this patent is extended or adjusted under 35 U.S.C. 154(b) by 0 days.

(21) Appl. No.: 09/794,752

(22) Filed: Feb. 27, 2001

Related U.S. Application Data (60) Provisional application No. 60/187,316, filed on Mar. 6, 2000.

(51) Int. Cl.[7] .............................................. F16H 25/20
(52) U.S. Cl. ...................... 74/89.33; 74/89.37; 74/89.39
(58) Field of Search ............................... 74/89.32, 89.33, 74/89.37, 89.39

(56) References Cited

U.S. PATENT DOCUMENTS

| | | | |
|---|---|---|---|
| 2,022,914 A | * 12/1935 | Hollmann | |
| 3,239,218 A | * 3/1966 | Reeves | |
| 3,319,481 A | * 5/1967 | Goodman | .................. 74/424.8 |
| 3,563,106 A | * 2/1971 | Goodman | .................. 74/424.8 |
| 3,592,070 A | * 7/1971 | Hammond | |
| 3,745,840 A | * 7/1973 | Guralnick | |
| 3,844,177 A | * 10/1974 | Bourassa | |
| 3,977,262 A | * 8/1976 | Randolph | |
| 4,077,268 A | * 3/1978 | Hill | |
| 4,512,208 A | * 4/1985 | Lipinski et al. | |
| 4,526,053 A | * 7/1985 | Carson | |
| 4,572,014 A | * 2/1986 | Kluczynski | |
| 4,614,128 A | * 9/1986 | Fickler | |
| 4,637,272 A | * 1/1987 | Teske et al. | |
| 4,671,127 A | * 6/1987 | Yamaguchi et al. | |
| 4,727,762 A | 3/1988 | Hayashi | |
| 4,779,474 A | 10/1988 | Lövgren | |
| 4,782,713 A | 11/1988 | Torii et al. | |
| 4,794,810 A | 1/1989 | Parsons | |
| 4,821,456 A | 4/1989 | Nogaki | |
| 4,878,390 A | 11/1989 | Hauser | |
| 4,995,277 A | 2/1991 | Yanagisawa | |
| 5,058,445 A | 10/1991 | Nilsson | |
| 5,079,963 A | 1/1992 | Yamamoto et al. | |
| 5,111,709 A | 5/1992 | Torii et al. | |
| 5,251,501 A | 10/1993 | Katahira | |
| 5,370,214 A | * 12/1994 | Katahira | .................. 198/345.1 |
| 5,425,607 A | 6/1995 | Hardesty | |
| 5,461,935 A | * 10/1995 | Hill | ........................ 74/424.8 R |
| 5,482,416 A | 1/1996 | Reko | |
| 5,531,557 A | * 7/1996 | Springer | ...................... 414/401 |
| 5,582,066 A | 12/1996 | Rütschle et al. | |
| 5,720,202 A | 2/1998 | Senjo et al. | |
| 5,799,543 A | 9/1998 | Nagai et al. | |
| 5,852,949 A | 12/1998 | Cartensen | |
| 6,125,731 A | * 10/2000 | Seto | ........................ 83/437.4 |

* cited by examiner

Primary Examiner—Allan D. Herrmann
(74) Attorney, Agent, or Firm—Dorsey & Whitney LLP (57) ABSTRACT

A stabilizer for a ball screw actuator of the type having a housing, and externally threaded lead screw and a drive nut movable along the lead screw in which the stabilizer includes a first member rotationally fixed but movable linearly relative to the cylinder housing and a second member rotatable relative to, but linearly fixed, relative to the first member.

19 Claims, 4 Drawing Sheets

STABILIZER FOR BALL SCREW ACTUATOR

This application claims the benefit of Provisional Application Serial No. 60/187,316 filed Mar. 6, 2000.

BACKGROUND OF THE INVENTION

1. Field of the Invention

The present invention relates generally to a linear positioning system and more specifically to a stabilizing means for a linear positioning system such as a ball screw actuator.

2. Description of the Prior Art

A variety of systems are known in the prior art and utilized for linearly moving and positioning a workpiece relative to a housing. Some of such positioning systems use an elongated housing in the form of an elongated hollow cylinder with a slot therein and a piston or other motion transfer member moveable reciprocally along the cylinder. In these systems, a carrier bracket is connected to the piston or other motion transfer member and extends through the slot for the purpose of transferring the linear movement of the piston or motion transfer member to a workpiece. In some embodiments, movement of the piston or other motion transfer member results from the use of piston rods or pneumatic pressure selectively delivered to pneumatic pressure chambers within the cylinder on opposite sides of the piston.

In other embodiments, movement of the piston or other motion transfer member is in the form of a spindle nut having internal threads matching the external threads of an elongated, rotatably driven threaded spindle. In these embodiments, the rotatably driven spindle extends substantially from one end of the cylinder to the other and the spindle nut which is rotationally fixed relative to the cylinder, advances or retracts linearly along the cylinder in response to rotational movement of the spindle. Linear positioning systems of this type are sometimes referred to as threaded actuators or ball screw actuators.

By rotating the externally threaded spindle, the internally threaded spindle or drive nut, and thus the connected workpiece, can be linearly positioned along the length of the cylinder or other supporting housing. In actuators of this type, efficiencies of cost and operation are achieved by decreasing the diameter of the threaded spindle and increasing the speed at which the spindle rotates, thereby increasing the speed at which the drive nut and thus the workpiece can be moved from one position to another. Unfortunately, both of these tendencies place significant limitations on the actuator. Because the threaded spindle is supported only at its ends, the middle portion of the spindle will tend to sag, thereby creating an out-of-balance or eccentric condition when the spindle is rotated. This out-of-balance condition is accentuated with a decrease in the diameter of the spindle, an increase in the rotational speed of the spindle or an increase in the length of the spindle. Thus, for a given spindle diameter, an unacceptable increase in the rotational speed or spindle length will cause the spindle to wobble or whip in jump rope fashion along the axis of the cylinder. This not only places an upper limit on the acceptable linear speed and spindle length, but also leads to premature fatigue and wear of the spindle and drive nut and faulting of the rotary drive mechanism. Such vibrations and whipping action can also impair the accuracy of the positioning system.

In ball screw actuators as described above, the critical rotation speed at which the spindle begins to unacceptably vibrate or whip is a function of the spindle length and the spindle diameter. Although the critical speed can be increased by using larger spindle diameter for a particular spindle length, this leads to increased cost. Further, as the diameter, and thus the mass of inertia, of the spindle increases, larger and more expensive rotational drive motors are needed.

A variety of solutions have been proposed to dampen the vibrations or whipping action of the threaded spindle and thus effectively increase the critical speed at which a given spindle can be rotated. These solutions function primarily by providing a vibration damping member on the spindle between the support points. Such clamping members are generally moveable or displaceable along the spindle as the spindle nut advances and retracts along the length of the spindle. Some of these prior means are disclosed in U.S. Pat. No. 4,794,810 issued to Parsons, U.S. Pat. No. 4,821,456 issued to Nogaki, U.S. Pat. No. 4,878,390 issued to Hauser, U.S. Pat. No. 5,251,501 issued to Katahira, U.S. Pat. No. 5,425,607 issued to Hardesty and U.S. Pat. No. 5,531,557 issued to Springer.

Although some of these function to increase the critical speed for a given actuator system to some extent, various drawbacks and limitations continue to exist. These include the complexity of the devices and the limit to which the critical speed can be increased, among others. Accordingly, there is a continuing need in the art for a stabilizer mechanism usable with a ball screw actuator or the like which limits the vibration or whipping action of the spindle and thus increases the critical speed at which a given spindle rotates.

SUMMARY OF THE INVENTION

The present invention relates to a stabilizing mechanism for a ball screw actuator or the like which dramatically increases the critical speed for a given actuator system of up to three times or more. More specifically, the stabilizing mechanism of the present invention includes one or more a support members which are moveable linearly along the rotating spindle to selected locations between the support points to provide support for the spindle. This reduces vibrations and whipping action and thus increases the critical speed of the spindle.

Still more specifically, the stabilizing mechanism of the present invention is designed for use with a ball screw actuator or the like having an elongated housing in the form of a hollow cylinder, a threaded spindle extending the length of the cylinder and a spindle or drive nut rotationally fixed relative to the housing for linear movement along the cylinder. The stabilizing mechanism generally includes one or more stabilizing units, each of which includes a stabilizer nut with internal threads substantially matching those of the spindle and means in the form of a stop for limiting the linear movement of the stabilizer nut relative to the spindle. In the preferred embodiment, a bearing member is provided to limit friction between such elements.

Each stabilizing unit in accordance with the present invention further includes a first member or slider which is moveable linearly relative to the housing and which engages the stop positioned on the housing. Mounted within the slider is a bearing member which is adapted for engagement by the stabilizer nut. In the preferred embodiment, the slider is rotationally fixed, but linearly moveable, relative to the housing.

In a most preferred embodiment, the stabilizer unit in accordance with the present invention includes a pair of linearly spaced bearings mounted within the slider, with the stabilizer nut positioned therebetween. In a still further preferred embodiment, grease or other drag inducing means is provided between an external surface of the stabilizer nut and an internal surface of the slider to create a controlled drag between the slider and the stabilizer nut to advance the stabilizer nut in a controlled movement along the spindle.

Accordingly, it is an object of the present invention to provide an improved stabilizer mechanism for a ball screw actuator or the like.

Another object of the present invention is to provide a stabilizer mechanism for a ball screw actuator or the like which effectively increases the critical speed at which a given actuator can operate.

Another object of the present invention is to provide a stabilizing means for a linear positioning system of the type having a rotatable spindle which includes a stabilizer nut with internal threads substantially matching that of the spindle.

A further object of the present invention is to provide a stabilizing mechanism for a ball screw actuator or the like which includes an outer slider and an inner stabilizing nut with controlled drag means disposed between such elements.

A still further object of the present invention is to provide a stabilizing mechanism for a ball screw actuator or the like which provides a spindle damping mechanism moveable along the spindle and positioned between the points of spindle support.

These and other objects of the present invention will become apparent with reference to the drawings, the description of the preferred embodiment and the appended claims.

DESCRIPTION OF THE PREFERRED EMBODIMENT

The stabilizing mechanism of the present invention is designed for use with a ball screw actuator or the like for the purpose of decreasing the vibrations and whipping action resulting from rotation of the lead screw, to thereby increase the critical speed for a given actuator system. It is contemplated that the stabilizer mechanism of the present invention can be used with any system having a rotating screw member, but particular application to systems which are commonly referred to as ball screw actuators or screw drives. The present invention is particularly applicable to ball screw actuators having lead screws of extended length. Although the stabilizer mechanism of the present invention has a variety of applications, the preferred embodiment of the present invention will be described with respect to a ball screw actuator of the type illustrated in FIG. 1.

Figure 1:
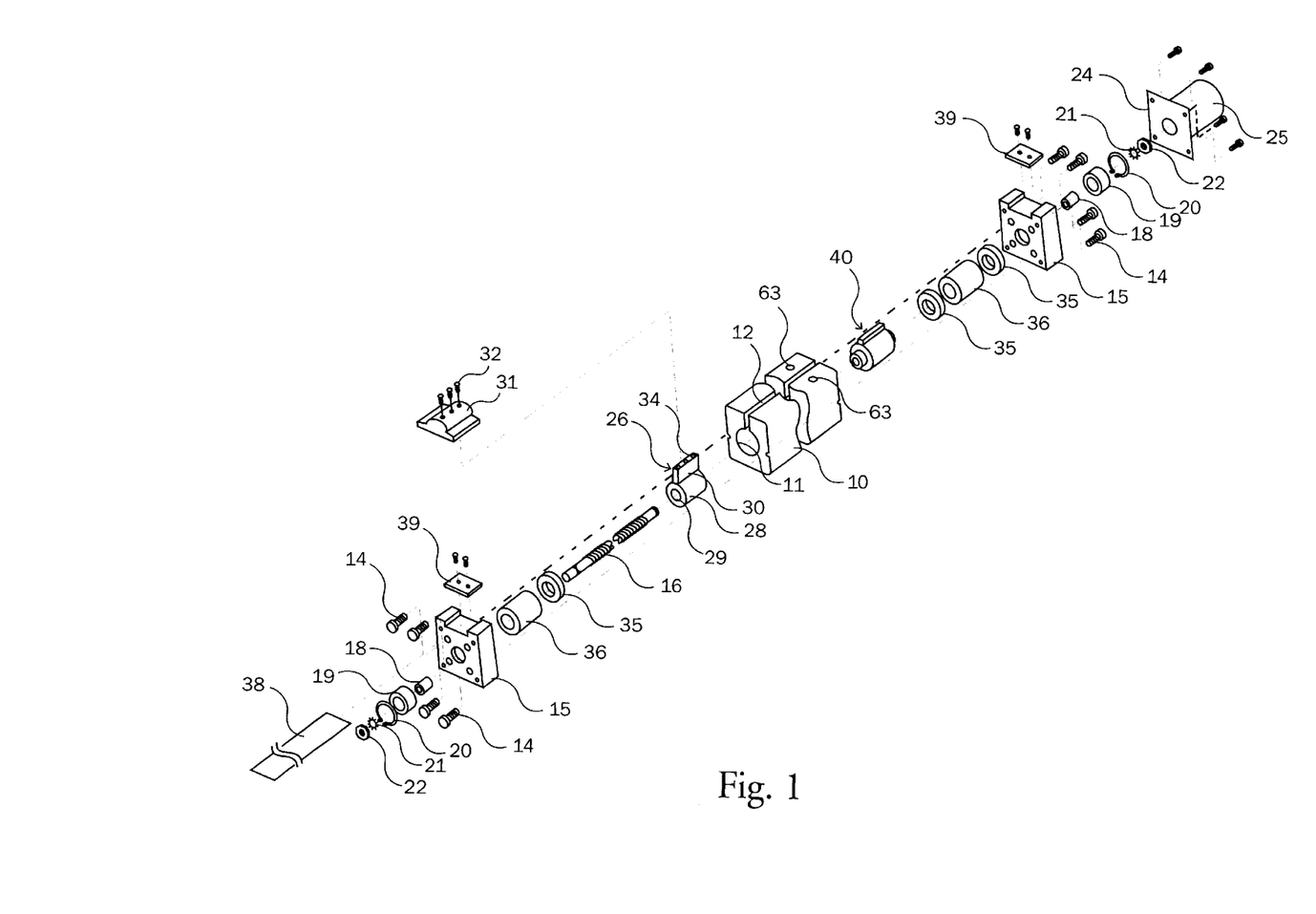
FIG. 1 is an isometric, exploded view with portions removed, of a ball screw actuator of the type with which the stabilizer of the present invention is designed for use.

With reference to FIG. 1, a ball screw actuator to which the stabilizing mechanism of the present invention has particular application includes an elongated tube or cylinder 10 having an internal bore 11 extending the length of the cylinder. One side of the cylinder 10 is provided with an elongated slot 12 opening into the bore 11. Similar to the bore 11, the slot 12 extends the entire length of the cylinder 10. An actuator head 15 is connected to each end of the cylinder 10 by cap screws 14 or the like. In the preferred embodiment, the bore 11 has a circular cross-section of constant diameter, however, various other shapes which are elongated in cross-sectional dimensions or have corners can be used as well.

Mounted within the bore 11 of the cylinder 10 is an elongated lead screw or spindle 16 extending through the entire length of the bore 11 and rotatably supported at each of its ends in the actuator heads 15, 15. A plurality of support elements including a bearing sleeve 18 and a contact bearing 19 are mounted in each of the actuator heads 15 to rotatably support the screw 16. The bearing is retained by the retaining ring 20. The axial position of the screw 16 relative to the cylinder 10 is retained by a lock washer 21 and lock nut 22 at each end. As shown, the lead screw 16 is provided with external threads along a substantial portion of its length. These threads may be ACME, v-groove or any other form of thread used in connection with ball screw actuators or other screw drives. A motor mounting plate 24 and a motor 25 are mounted at one end of the cylinder assembly to one of the actuator heads 15. The motor 25 includes an appropriate means for connection with an end of the lead screw 16 to rotate the same. The motor 25 can be of any type commonly used with ball screw actuators including motors which are electrically or hydraulically driven, among others.

Also positioned within the bore 11 of the cylinder 10 is a drive nut bracket assembly 26. The drive nut bracket assembly includes a generally cylindrical body 28 having a generally cylindrical exterior configuration, an interior bore 29 and a motion transfer portion 30 extending from the main body portion 28 and through the elongated slot 12 in the cylinder 10. As shown best in FIG. 1, the dimensions of the cylindrical configuration of the body 28 are less than the dimensions of the cylinder bore 11. This allows the drive nut assembly 26 to move back and orth along the longitudinal axis of the bore 11 and to avoid engagement with the stop pins 62 (FIG. 6) as will be described in greater detail below. The motion transfer web 30 extends upwardly through the cylinder slot 12 for connection with a carrier bracket 31 or other work piece. The carrier 31 is connected with the transfer web 30 by a plurality of cap screws 32 extending through the carrier 31 and into threaded openings 34 in the outer edge of the transfer web 30. Because the web 30 extends through the cylinder slot 12, the assembly is rotationally fixed relative to drive nut 26 and the cylinder 10. However, the drive nut assembly 26 is free to move reciprocally along the length of the slot 12.

The drive nut bore 29 is provided with internal threads which match the exterior threads of the lead screw 16. As a result, rotation of the screw 16, while the drive nut 26 remains rotationally fixed within the cylinder 10, causes the nut 26 to move along the length of the cylinder 10 in a direction generally parallel to its longitudinal axis. This in turn results in a corresponding movement of the carrier 31 and/or other connected work piece.

The ball screw actuator shown in FIG. 1 also preferably includes various other elements including a plurality of bumpers 35 and spacers 36. A dust band 38 and dust band clamps 39, 39 may also be used, if desired, to keep dust and other contaminants from the internal cylinder bore 11. Various other elements common to ball screw actuators or screw drives may also be utilized. Such other elements are well-known in the art. Examples of screw drives to which the present invention has particular application are screw drives such as those manufactured and sold by Tol-O-Matic, Inc. of Hamel, Minn.

Also shown in FIG. 1 is a stabilizing mechanism 40 in accordance with the present invention. This mechanism 40 is positioned within the cylinder bore 11 between the drive nut assembly 26 and an end of the cylinder 10. Although only one stabilizing mechanism is shown, more than one such mechanism can be used, particularly for lead screws of extended length. In general, the stabilizing mechanism 40 is designed to move through the cylinder bore 11 to one or more selected positions for the purpose of supporting the lead screw 16 at a point between the drive nut 26 and a corresponding end of the cylinder 10. This support decreases the vibration and whipping action of the screw 16, and the thus increases the critical speed for a particular actuator configuration.

Means are also provided in the cylinder 10 for stopping or limiting linear movement of the mechanism 40 along the cylinder. As will be described in greater detail below, such means in the preferred embodiment comprise pins 62 (FIG. 6) positioned in holes 63 (FIGS. 1, 6 and 7) in the cylinder wall.

Reference is next made to FIGS. 2–5 illustrating the detailed structure of the stabilizing mechanism 40 (FIG. 2) in accordance with the present invention. As shown best in FIG. 2, the stabilizing mechanism 40 includes an external support housing or slider 41, a center support nut 42, a pair of thrust bearings 44 and a pair of thrust washers 45 and 45 on opposite sides of each of the bearings 44. The washers 45 and 46 are constructed of a relatively hard material and function to provide a race for the bearings 44. As shown best in FIGS. 2 and 4, the center support nut 42, the bearings 44 and the washers 45 and 46 are retained within the housing 41 by a pair of retaining rings 48.

Figure 2:
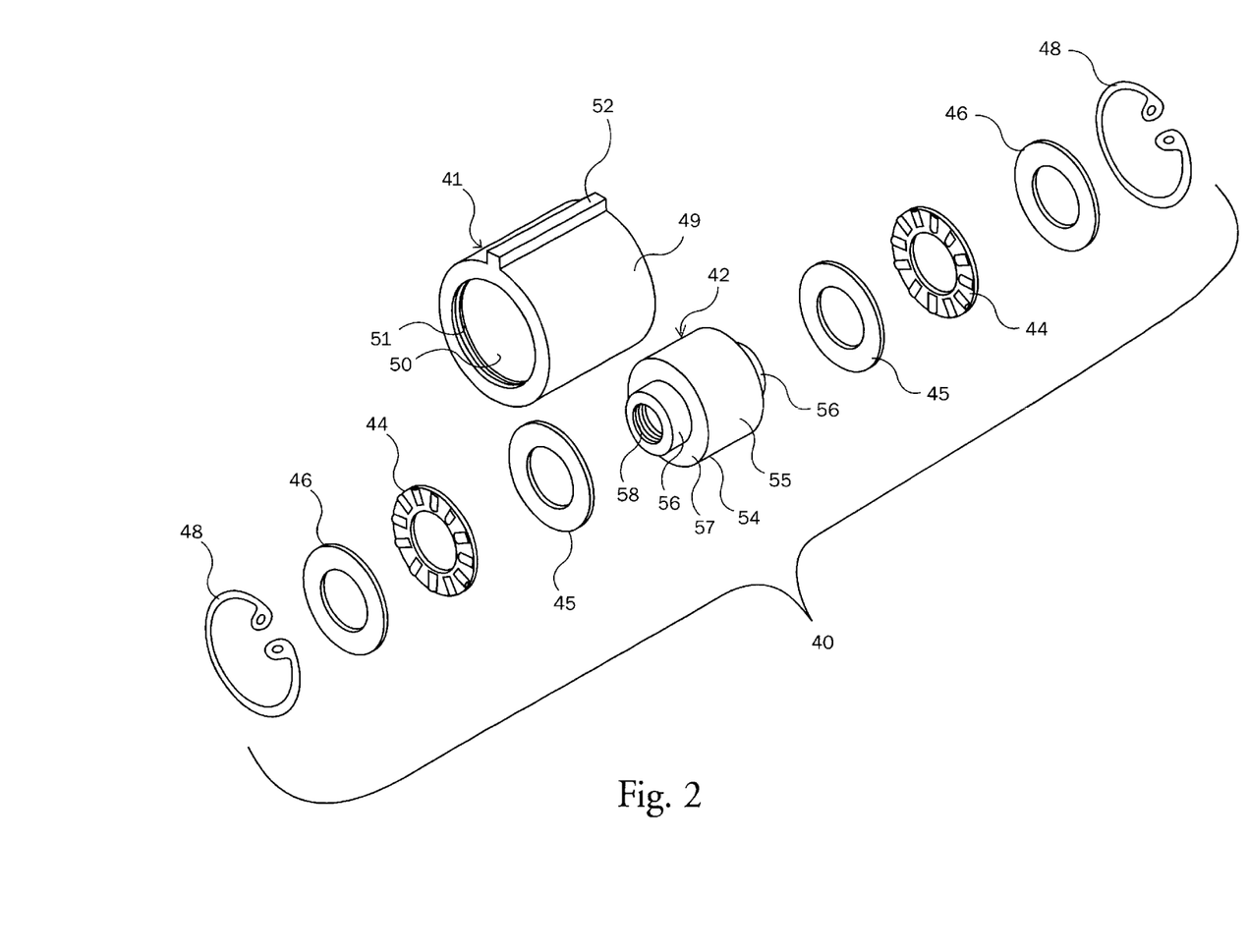
FIG. 2 is an isometric, exploded view of the stabilizer mechanism in accordance with the present invention.

More specifically, the support housing or slider 41 of the preferred embodiment is a generally cylindrical element having a generally cylindrical exterior surface 49 and a generally cylindrical internal bore 50. The diametrical dimension of the cylindrical exterior surface 49 is slightly less than the diametrical dimension of the interior cylinder bore 11. This enables the housing 41 to move longitudinally along the axis of the bore 11 while also minimizing and limiting radial movement of the housing 41 within the bore 11. The difference between the exterior diametrical dimension of the surface 49 and the interior diametrical bore 11 will vary with the size of the bore, the level of dimensional tolerances and the degree to which stabilization is desired. Preferably, however, for a two inch bore, this difference in diametrical dimensions ranges between about 0.10 and 0.200 inches, more preferably between about 0.025 and 0.125 inches, and most preferably between about 0.030 and 0.070 inches. A retaining ring groove 51 is provided near each end of the internal bore 50 for the purpose of receiving the retaining rings 48.

The exterior cylindrical surface 49 includes a guide member for preventing relative rotational movement between the housing 41 and the cylinder 10, while still permitting linear movement of the housing 41 along the cylinder 10 in a direction generally parallel to the longitudinal axis of the bore 11. In the embodiment of FIG. 2, this guide member is shown as a rib 52 integrally formed with the exterior surface 49 and extending outwardly therefrom. The rib 52 is designed to be located within the cylinder slot 12 (FIG. 1) and thus move along the slot as the housing 41 moves through the cylinder bore 11. To permit this movement, the rib 52 should extend outwardly from the surface 49 a sufficient distance to engage the cylinder slot 12 and should have a width less than the width of the slot 12 to permit the housing 41 to freely move along the slot in the longitudinal direction of the cylinder 10. The housing 41 is preferably constructed of an aluminum or aluminum alloy material. However, various other materials may be used as well.

Although the preferred embodiment shows the exterior configuration 49 to be generally cylindrical, it can also comprise other shapes as long as it is moveable longitudinally within the cylinder bore 11. Preferably, the configuration 49 should match that of the cylinder bore 11 configuration. Because the housing 41 does not rotate relative to the cylinder 10, the bore 11 and the exterior configuration 49 do not need to be circular. However, regardless of the shape of the configuration 49, the internal 50 should be circular or cylindrical to accommodate relative rotation of the support nut 42.

The center support nut 42 includes a generally cylindrical section 54 and a pair of end cylindrical sections 56, 56 extending outwardly from opposite ends of the cylindrical section 54. The cylindrical section 54 includes generally annular end sections 57, a generally cylindrical outer surface 55 having a diametrical dimension slightly less than the interior diametrical dimension of the housing bore 50. This permits the center nut 42 to be inserted into the interior bore 50 of the housing 41 and to rotate relative to it. The end cylindrical sections 56, 56 have an exterior cylindrical surface with a diametrical dimension less than that of the surface 55 and of a dimension sufficient to support the bearings 44 and washers 45 and 46. Accordingly, the outer cylindrical sections 56, 56 extend outwardly from the ends 57 of the center section 54 a distance sufficient to support the bearing 44 and the washers 45 and 46.

Figure 3:
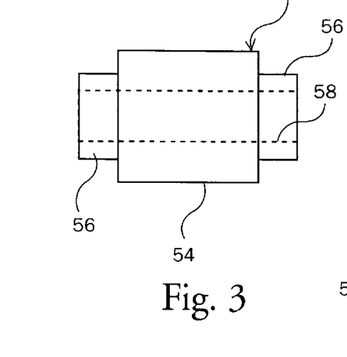
FIG. 3 is a view, partially in section of the stabilizer support nut as viewed along a plane extending along its longitudinal axis.

As shown in FIG. 3, the support nut 42 includes a central bore 58 extending through the entirety of the nut 42 in a direction parallel to the longitudinal axis of the nut 42. The bore 58 is provided with internal threads which substantially match the external threads of the lead screw 16 (FIG. 1). As a result, any force on the nut 42 tending to prevent rotation relative to the cylinder 10 will tend to move the nut 42 along the cylinder 10 in response to rotation to the lead screw 16. The nut 42 can be constructed of a variety of materials. Preferably, however, the nut 42 is constructed of a low friction plastic material such as Delrin AF or the like. Other materials can, however, be used.

Figure 4:
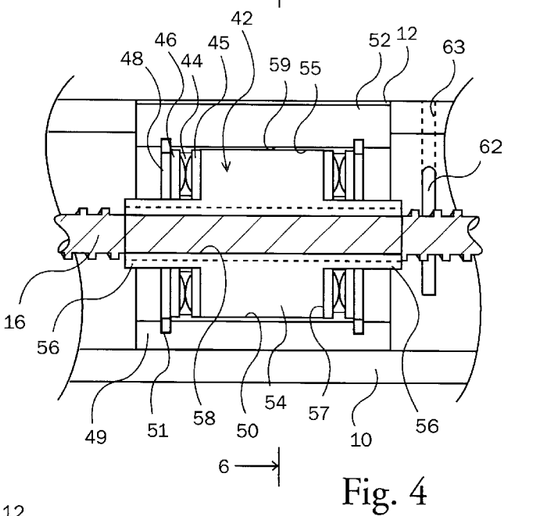
FIG. 4 is a view, partially in section showing the assembled stabilizer of the present invention installed in a ball screw actuator cylinder.

The bearings 44 are conventional roller thrust bearings which have an exterior diameter slightly less than the exterior cylindrical surface 55 and an interior diameter slightly greater than the exterior dimension of the cylindrical end sections 56 to permit the bearings 44 to be rotatably mounted relative to the nut 42 as shown in FIG. 4. Similar to the bearings, the washers 45 and 46 have an exterior diameter slightly less than the diameter of the cylindrical surface 55 and an internal diameter slightly greater than the exterior diameter of the cylindrical portions 56. The washers 45 and 46 are thrust washers and are preferably constructed of a hard material. The washers 45 and 46 are positioned on opposite sides of each bearing and function as a race for such bearings. A retaining ring 48 is positioned at each end and inserted into the retaining ring grooves 51 in the housing bore 50 to retain the nut 42, the bearings 44 and the washers 45 and 46 within the housing 41 as shown in FIG. 4.

Figure 4A:
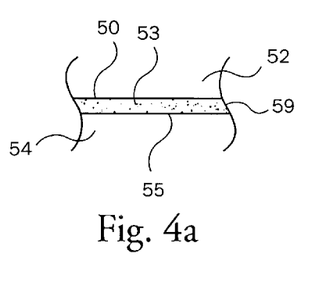
FIG. 4a is an enlarged view of a portion of FIG. 4 showing the viscous material between stabilizer elements.

When the stabilizer mechanism 40 is assembled as shown in FIG. 4, a slight space 59 exists between the outer cylindrical surface 55 of the nut 42 and the inner cylindrical surface of the housing bore 50. This space 59 results from the difference in diametrical dimensions between the two cylindrical surfaces 50 and 55. The size of this space 59 is selected to provide the preferred amount of drag as the nut 42 rotates relative to the housing 41. Preferably, for a two inch bore cylinder, the difference in diametrical dimensions between the surface 55 and the bore 50 is preferably between about 0.001 and 0.100, more preferably between about 0.003 and 0.025 and most preferably between about 0.005 and 0.015 inches. In some cases, sufficient drag exists between the rotatable nut and the rotationally fixed housing 41 to cause movement of the stabilizer mechanism 40 along the cylinder 10 in response to rotation of the lead screw 16; however, preferably, a viscous material or drag inducing medium 53 (see FIG. 4a) is introduced into the space 59 to increase the drag between the nut 42 and the housing 41. This viscous material 53 is preferably an oil or a grease which is sufficiently viscous to prevent it running out of or leaking from the space 59, but not so viscous that it significantly impedes operation of the actuator. In general, the viscous material is applied to the space 59 by coating the outside cylindrical surface 55 of the nut 42 before inserting the same into the housing bore 50.

Figure 6:
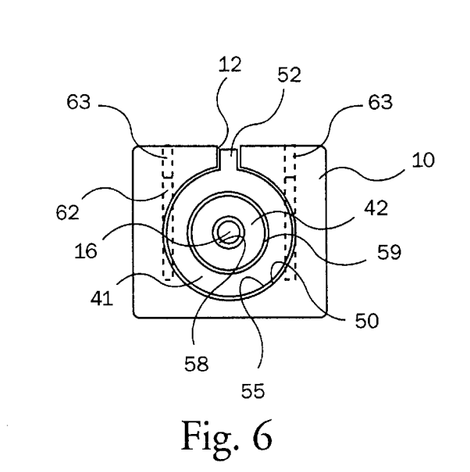
FIG. 6 is a view, partially in section, as viewed along the section line 6—6 of FIG. 4.

FIGS. 4 and 6 also show the stabilizer mechanism 40 positioned within the cylinder bore 11 of the cylinder 10. When the mechanism 40 is positioned within the cylinder bore 11, the exterior cylindrical surface 49 of the housing 41 conforms closely to the configuration of the bore 11, but with dimensions slightly less. This provides sufficient support for the lead screw 16, while also permitting linear movement of the housing 41 along the cylinder 10. As shown, the rib member 52 of the housing 41 extends into the cylinder slot 12 to prevent relative rotation between the housing 41 and the cylinder 10.

Figure 5:
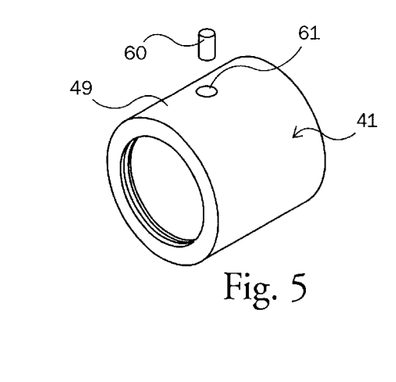
FIG. 5 is an isometric view of an alternate housing member for the stabilizer of the present invention.

FIG. 5 illustrates an alternate embodiment of the housing 41. In this embodiment, the guide member for guiding the housing and thus the stabilizing mechanism along the cylinder 10 is provided by a pin 60 which is press fit into a hole 61 in the exterior surface 49 of the housing 41. In this embodiment, the portion of the pin 60 extending outwardly from the surface 49 rides in the cylinder slot 12 to prevent relative rotational movement between the housing 41 and the cylinder 10, while permitting longitudinal movement along the cylinder. Various other structures are also possible for preventing rotational movement between the stabilizer housing 41 and the cylinder 10 such as ribs or grooves formed on the surface 49 and complementary grooves or ribs formed on the inner surface of the bore 11. The scope of the present invention is intended to cover all such mechanisms for preventing relative rotational movement between the housing 41 and the cylinder 10 while permitting linear movement along the length of the cylinder.

Figure 7:
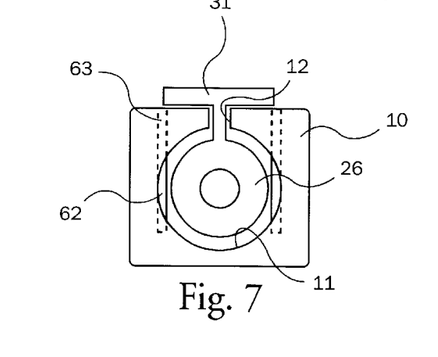
FIG. 7 is a sectional view of the ball screw cylinder showing the relationship between the stabilizer stop members and the drive nut.
Figure 8:
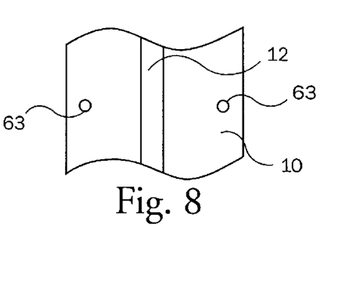
FIG. 8 is an elevational plan view of a portion of the ball screw cylinder showing the stop members.

Also positioned within the cylinder 10 and associated with the stabilizer mechanism 40 is a means for limiting the travel of the stabilizer mechanism 40 along the cylinder. A variety of means can be utilized to perform this function. One such means is illustrated in FIGS. 6, 7 and 8 comprising cross-sectional views of the cylinder 10. As shown, the stop means includes a pair of pins 62 extending through holes 63 in the top of the cylinder 10 as shown in FIG. 8. Specifically, the holes 63 extend downwardly from a side surface of the cylinder 10 to a point where they intersect at least a portion of the cylinder bore 11. Thus, the holes 63 must be spaced apart a distance less than the diametrical dimension of the cylinder bore 11. When a pin 62 is inserted into the hole 63, a portion of the pin extends inwardly from the internal surface of the cylinder bore 11, thus forming a stop surface to prevent movement of the stabilizing mechanism beyond that point. Various other stop means can be used as well including other forms of stop surfaces positioned in the bore 11 or stop surfaces associated with the guide members 52 (FIG. 2) or 60 (FIG. 5). In the embodiment for the stop member shown in FIGS. 6, 7 and 8, it is necessary for the diametrical dimension of the drive nut assembly 26 to be less than the distance between the pins 62 to permit the nut assembly 26 to pass the pin 62 during its movement along the cylinder 10.

The preferred embodiment of the present invention contemplates a single stabilizing mechanism 40 for a ball screw actuator; however, two or more such stabilizing mechanisms could, if desired, be utilized in a single ball screw actuator. One example where additional mechanisms 40 might be desired is for a ball screw actuator or screw drive of extended length. In such a case, it would be desirable to use multiple stabilizer mechanisms which are stopped at various positions along the length of the cylinder to provide additional lead screw support.

Figure 9:
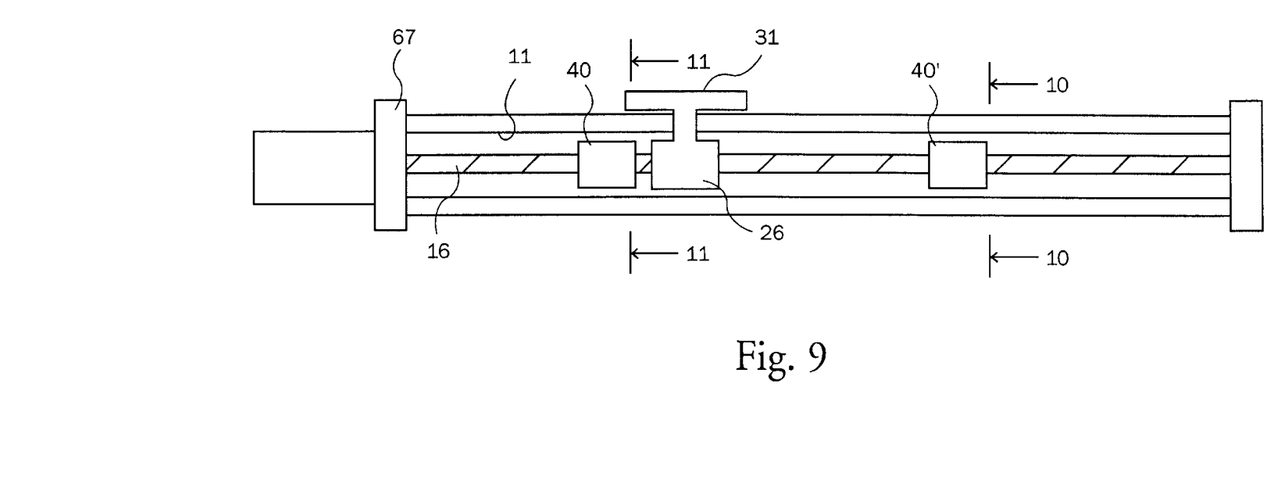
FIG. 9 is a view of an actuator with two stabilizing mechanisms.
Figure 10:
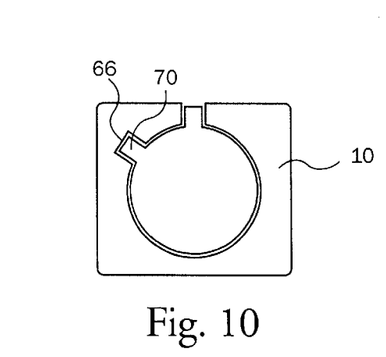
FIG. 10 is a view, partially in section, as viewed along the section line 10—10 of FIG. 9.
Figure 11:
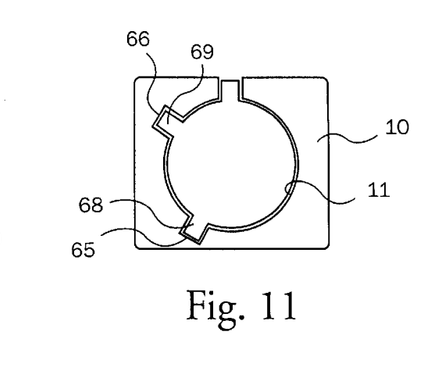
FIG. 11 is a view, partially in section as viewed along the section line 11—11 of FIG. 9.

When two or more stabilizing mechanisms 40 are used in a single actuator as shown in FIG. 9, two or more stop members corresponding to the mechanisms 40 and 40' must be used. Specifically, a stop member associated with each mechanism is utilized to stop that mechanism at a particular selected point along the length of the cylinder 10. Further, such stop members must be designed so that they are independent of one another and accordingly, selectively stop or limit the movement of only the particular mechanism with which the stop member is associated. One way of providing stop members for more than one mechanism is to utilize stop members which are comprised of grooves in the internal portion of the bore, with corresponding ribs in the housings 41 of the mechanisms 40 and 40'. For example, in FIGS. 9–11, the bore 11 includes a groove 65 which extends from the end 67 to the position of the mechanism 40 shown in FIG. 9 and a groove 66 which extends from the end 67 to the position of the mechanism 40' of FIG. 9. The grooves 65 and 66 accommodate the ribs 68, 69 of the mechanism 40, while the groove 65 also accommodates the rib 70 of the mechanism 40'. With this structure, the mechanisms 40 and 40' are permitted to travel from the end 67 to their respective positions shown in FIG. 9.

Having described the preferred embodiment of the present invention, the operation can be understood as follows: during operation, the drive nut assembly 26 and the thus the carrier 31 and/or other load connected to the assembly 26 is caused to move along the length of the cylinder 10 from one end to the other as a result of rotation of the lead screw 16. This movement along the cylinder results from the drive nut assembly having internal threads matching those of the lead screw 16 and being rotationally fixed relative to the cylinder. As the nut 26 moves from one end of the cylinder to the other, the stabilizer mechanism 40 will tend to follow the movement of the drive nut 26 until it reaches the stabilizer stop pins 62, 62 (FIGS. 6 and 7). These pins 62 are preferably positioned approximately midway between the cylinder ends. The movement of the stabilizer mechanism 40 occurs because of the drag between the rotationally fixed housing 41 and the support nut 42 threadedly positioned on the lead screw 16. Such a drag is preferably created by the viscous material between the nut 42 and the housing 41. When the mechanism 40 reaches the stop members 62, further linear movement of the mechanism 40 along the cylinder is prevented. At this point, the support nut 42 rotates with the lead screw 16 and relative to the housing 41 within the bore 50. Friction between the relatively rotating members 42 and 41 is decreased by the existence of the bearings 44. The existence of the stabilizing mechanism at this point along the cylinder supports the lead screw 16 to prevent or minimize its sagging. This accordingly reduce vibrations and whipping action. Upon reversing the rotation of the lead screw, the drive nut will return to the opposite or beginning end of the cylinder and the stabilizing mechanism, because of the internal drag between the nut 42 and the housing 41, will also return to the beginning end of the cylinder.

Accordingly, it can be seen that the present invention relates generally to a ball screw actuator or the like of the type having a housing, an externally threaded lead screw or spindle rotatably supported at first and second points relative to the housing and a spindle or a drive nut which is movable linearly along the lead screw between the first and second points. The stabilizer mechanism is comprised of a first member in the form of the housing 41 which is movable linearly relative to the housing between one of the first and second points and a support point defined by a stop member. The stabilizing mechanism includes a second member in the form of the support nut 42 which is rotatable relative to the first member and substantially linearly fixed relative to the first member. The second member includes internal threads substantially matching the external threads of the lead screw 16 threadedly mounted onto the lead screw.

Although the description of the preferred embodiment has been quite specific, it is contemplated that various modifications could be made without deviating from the spirit of the present invention. Accordingly, it is intended that the scope of the present invention be dictated by the appended claims rather than by the description of preferred embodiment.

What is claimed:

1. A stabilizer for a ball screw actuator comprising:
   a first member moveably linearly relative to said actuator and having an outer surface and an opening therethrough defining an inner surface and
   a second member positioned within said opening and being rotatable relative to said first member and linearly fixed relative to said first member, said second member further having an outer surface adjacent to the inner surface of said first member.

2. The stabilizer of claim 1 wherein said first member has a generally tubular configuration and wherein said opening is generally cylindrical.

3. The stabilizer of claim 2 wherein said outer surface of said second member has a generally cylindrical configuration.

4. A stabilizer for a screw actuator of the type having an elongated tubular housing with an inner tubular surface, an externally threaded spindle rotatably supported within the tubular housing at first and second points relative to said housing and a spindle nut moveable linearly along said spindle between said first and second points and within the tubular housing, said stabilizer comprising:
   a first member moveable linearly relative to, and within, said housing between one of said first and second points and a support point positioned between said one point and said spindle nut, said first member having an outer tubular surface substantially matching the configuration of the inner tubular surface of the housing;
   a second member rotatable relative to said first member and substantially linearly fixed relative to said first member, said second member having internal threads substantially matching the external threads of said spindle and threadedly mounted on said spindle.

5. The stabilizer of claim 4 wherein said first member is rotationally fixed relative to said housing.

6. The stabilizer of claim 4 including a bearing mounted in said first member for engagement by said second member.

7. The stabilizer of claim 4 wherein said housing includes a stabilizer stop member for engagement by said first member and wherein engagement between said first member and said stabilizer stop member defines said support point.

8. The stabilizer of claim 4 wherein said first member includes means to prevent relative rotational movement between said first member and said housing.

9. A stabilizer for a ball screw actuator or the like having a housing, an externally threaded spindle rotatably supported at first and second points relative to said housing and a spindle nut moveable linearly along said spindle between said first and second points, said stabilizer comprising:
   a first member moveable linearly relative to said housing between one of said first and second points and a support point positioned between said one point and said spindle nut;
   a second member rotatable relative to said first member and substantially linearly fixed relative to said first member, said second member having internal threads substantially matching the external threads of said spindle and threadedly mounted on said spindle; and
   a pair of bearings mounted in said first member for engagement by said second member, and second member positioned between said pair of bearings.

10. The stabilizer of claim 9 wherein said first member includes a generally cylindrical interior surface and said second member includes a generally cylindrical exterior surface and wherein the stabilizer includes a drag inducing medium between said interior and exterior surfaces.

11. The stabilizer of claim 10 wherein said ball screw actuator or the like is of the type wherein said housing includes an elongated cylinder with an interior cylindrically configured surface and wherein said first member includes an exterior cylindrically configured surface slideably moveable in a linear direction relative to said interior cylindrically configured surface.

12. A ball screw actuator comprising:
   a generally tubular housing having a longitudinal axis, an inner tubular surface and a guide groove extending generally parallel to said longitudinal axis;
   an externally threaded spindle rotatably supported within said tubular housing at first and second points relative to said housing;
   a spindle nut moveable linearly along said spindle between said first and second points; and
   a stabilizer including;

a first member moveable linearly relative to said housing between one of said first and second points and a support point positioned between said one point and said spindle nut, said first member having an outer surface and a guide member for sliding engagement with said one guide groove;

a second member rotatable relative to said first member and substantially linearly fixed relative to said first member, said second member having internal threads substantially matching the external threads of said spindle and threadedly mounted on said spindle.

13. The actuator of claim 12 wherein said first member is rotationally fixed relative to said housing.

14. The actuator of claim 12 including a bearing mounted in said first member for engagement by said second member.

15. The actuator of claim 12 wherein said housing includes a stabilizer stop and wherein engagement between said first member and said stabilizer stop defines said support point.

16. The actuator of claim 12 wherein said first member includes means to prevent relative rotational movement between said first member and said housing.

17. A ball screw actuator comprising:

a housing;

an externally threaded spindle rotatably supported at first and second points relative to said housing;

a spindle nut moveable linearly along said spindle between said first and second points; and a stabilizer including;

a first member moveable linearly relative to said housing between one of said first and second points and a support point positioned between said one point and said spindle nut;

a second member rotatable relative to said first member and substantially linearly fixed relative to said first member, said second member having internal threads substantially matching the external threads of said spindle and threadedly mounted on said spindle; and a pair of bearings mounted in said first member for engagement by said second member 2, said second member positioned between said pair of bearings.

18. The actuator of claim 17 wherein said first member includes a generally cylindrical interior surface and said second member includes a generally cylindrical exterior surface and wherein the stabilizer includes a drag inducing medium between said interior and exterior surfaces.

19. The actuator of claim 18 wherein said housing includes an elongated cylinder with an interior cylindrically configured surface and wherein said first member includes an exterior cylindrically configured surface slideably moveable in a linear direction relative to said interior cylindrically configured surface.

* * * * *